Feb. 28, 1950          E. NICHOLSON          2,499,153
APPARATUS FOR TREATING LIQUIDS WITH LIGHT RAYS
Filed June 13, 1947          8 Sheets-Sheet 1
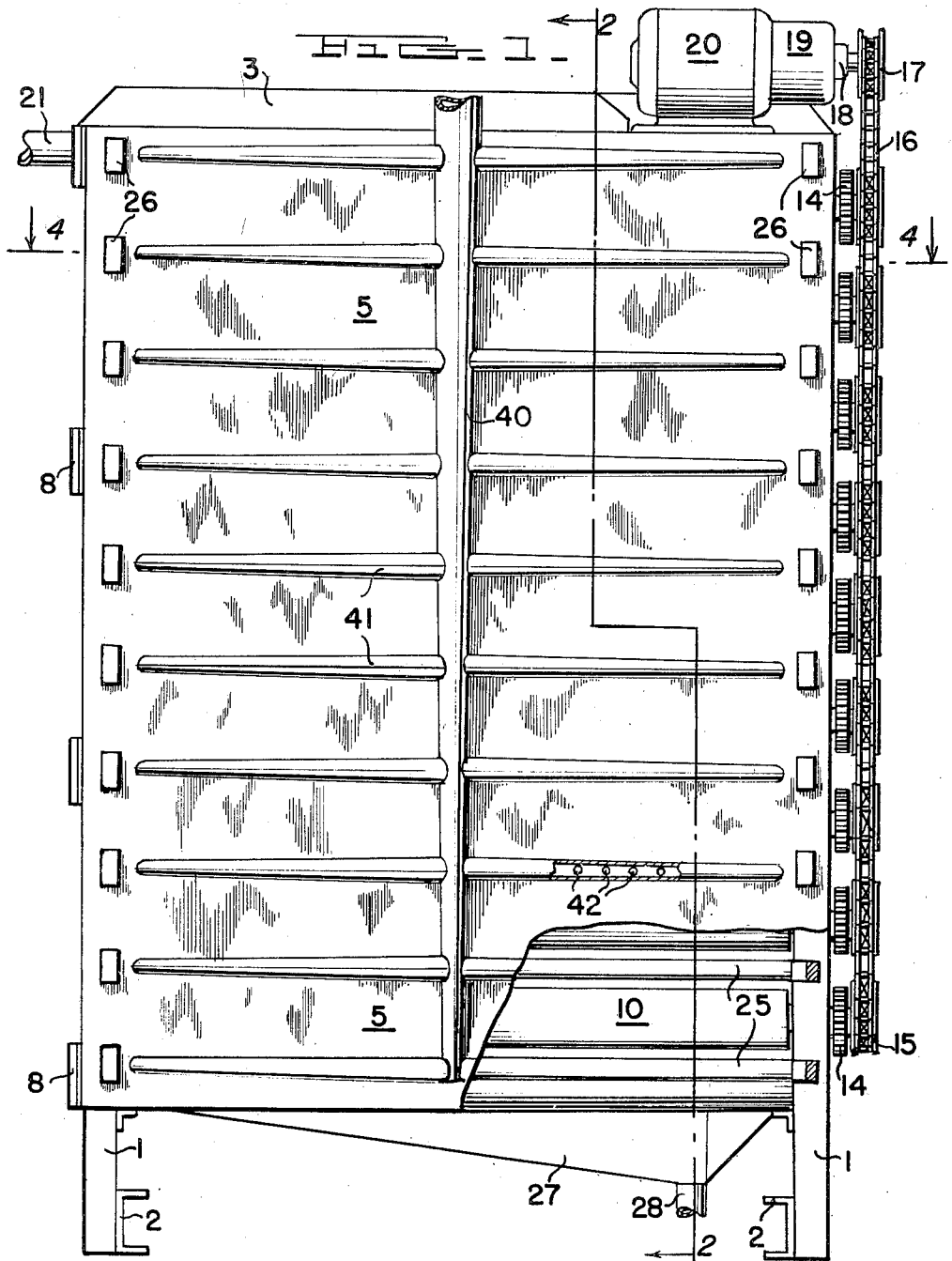
INVENTOR.
Emmett Nicholson
BY
Stone, Boyden & Mack
Attorneys

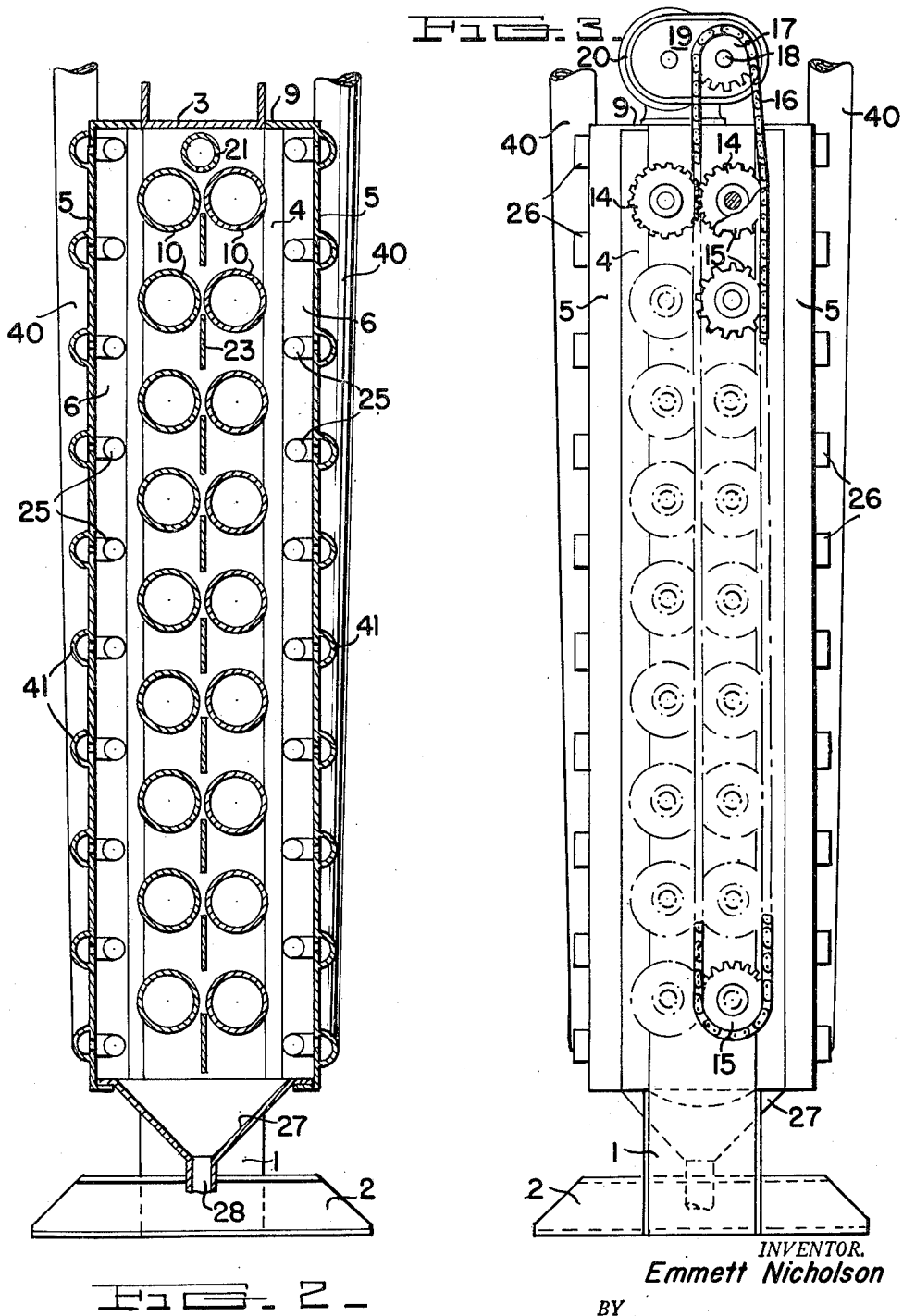

Feb. 28, 1950          E. NICHOLSON          2,499,153
APPARATUS FOR TREATING LIQUIDS WITH LIGHT RAYS
Filed June 13, 1947          8 Sheets-Sheet 3
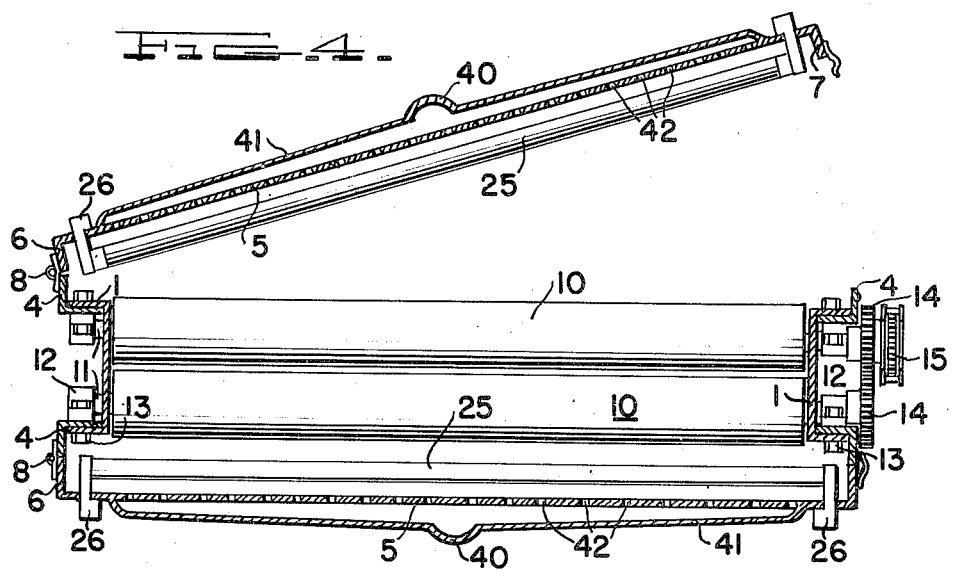
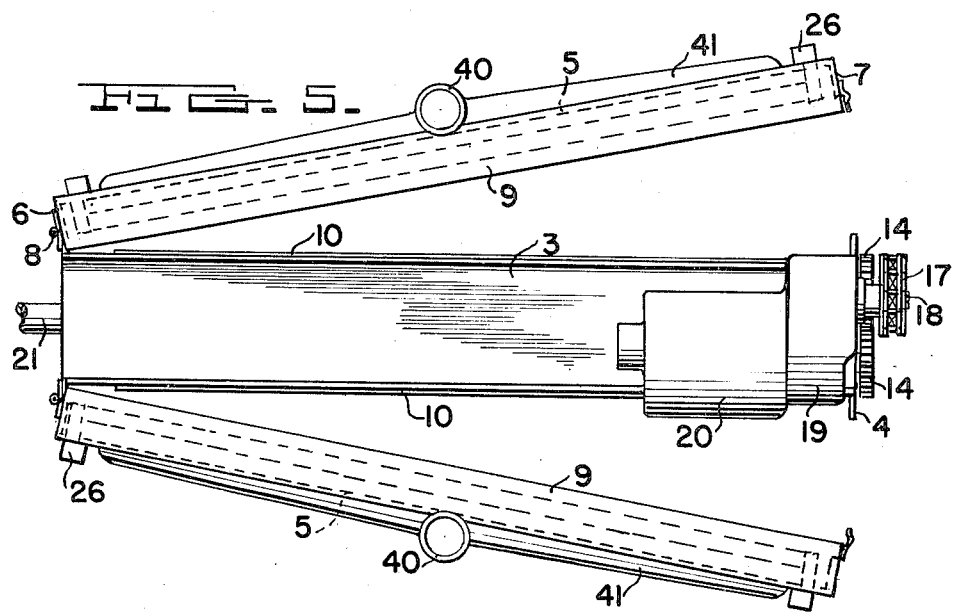
INVENTOR.
Emmett Nicholson
BY
Stone, Boyden & Mack,
Attorneys Feb. 28, 1950  E. NICHOLSON  2,499,153
APPARATUS FOR TREATING LIQUIDS WITH LIGHT RAYS
Filed June 13, 1947  8 Sheets-Sheet 4
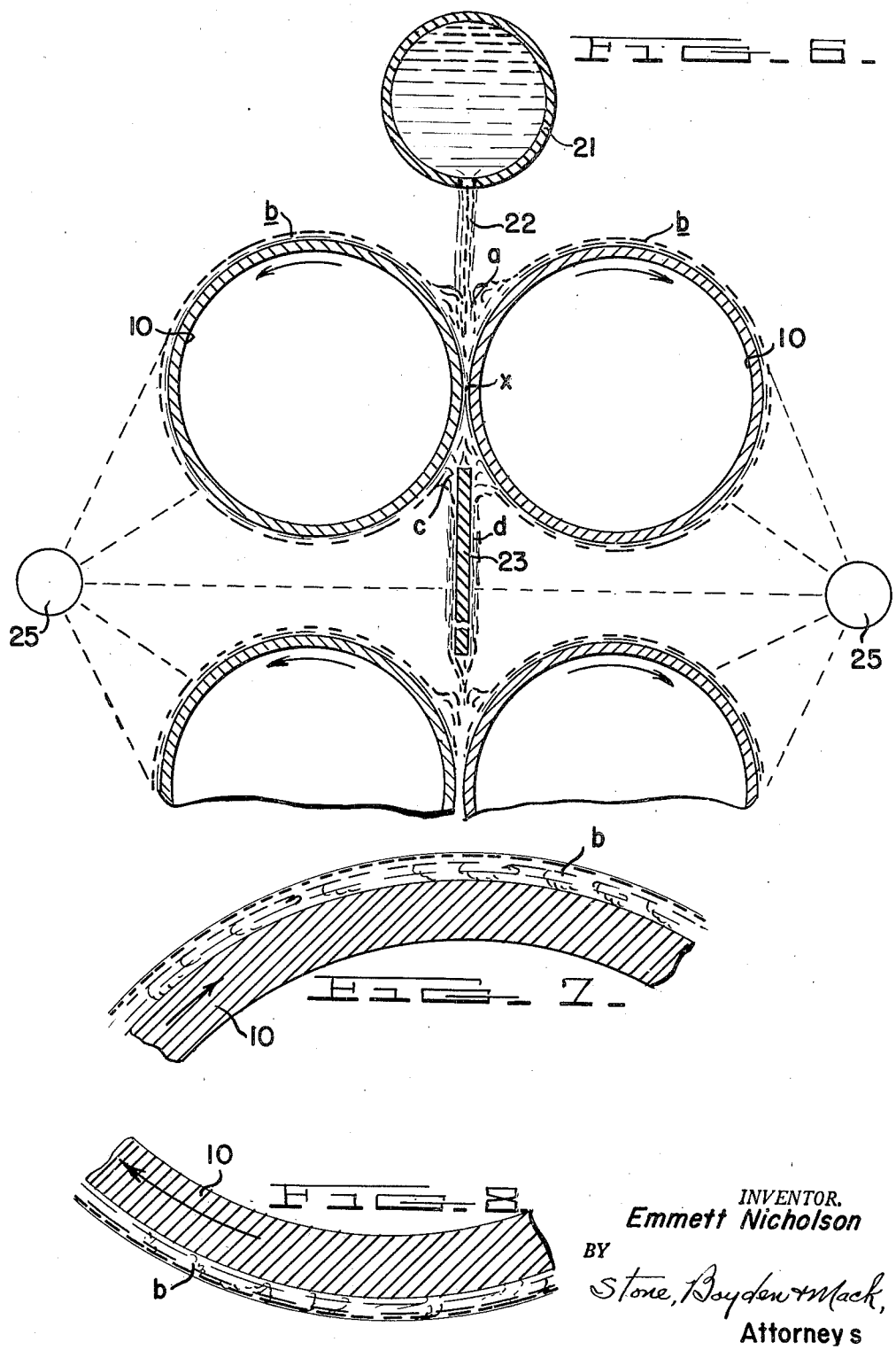
INVENTOR.
Emmett Nicholson
BY
Stone, Boyden+Mack,
Attorneys

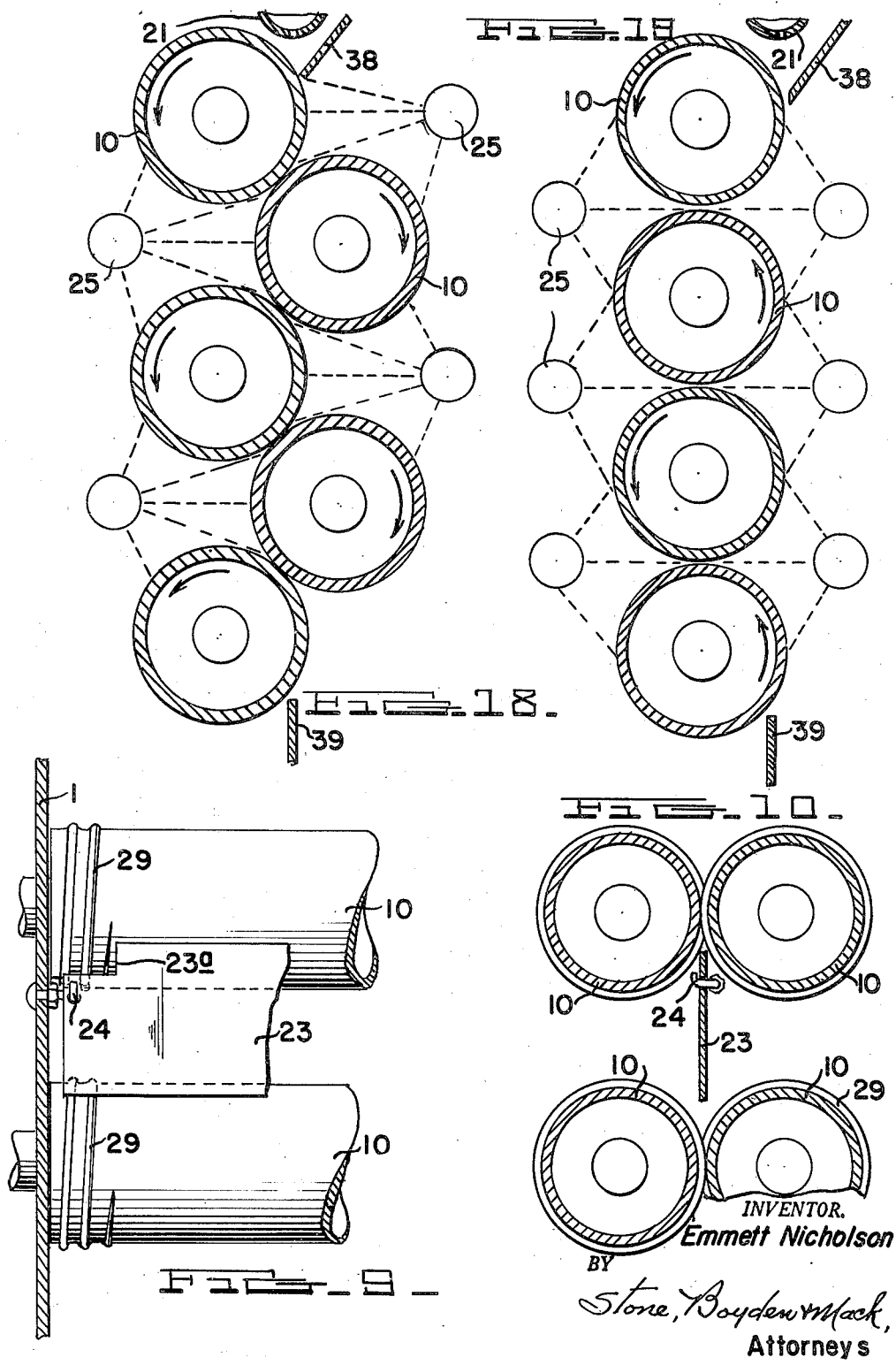

Feb. 28, 1950     E. NICHOLSON     2,499,153
APPARATUS FOR TREATING LIQUIDS WITH LIGHT RAYS
Filed June 13, 1947     8 Sheets-Sheet 6
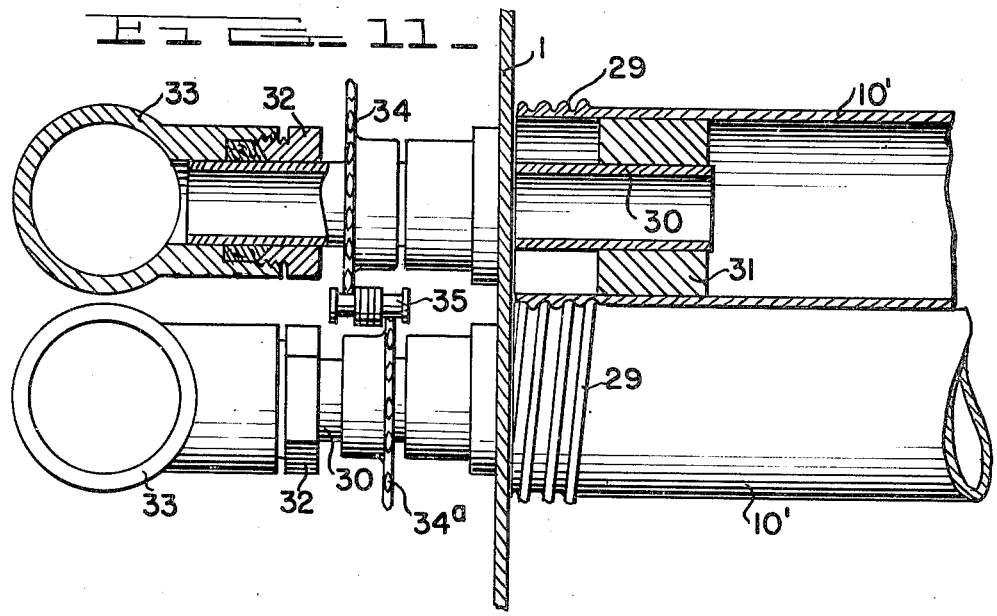
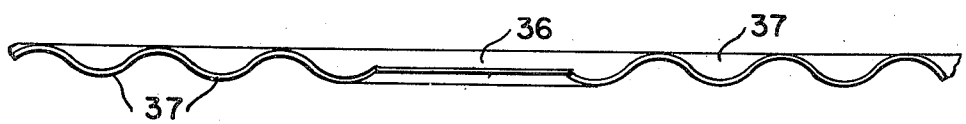
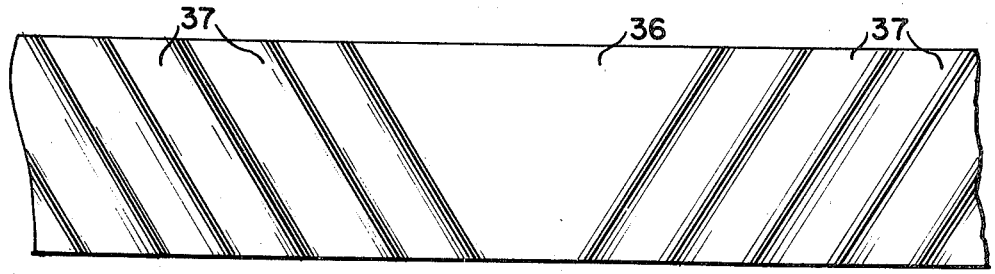
INVENTOR.
Emmett Nicholson
BY
Stone, Boyden & Mack,
Attorneys

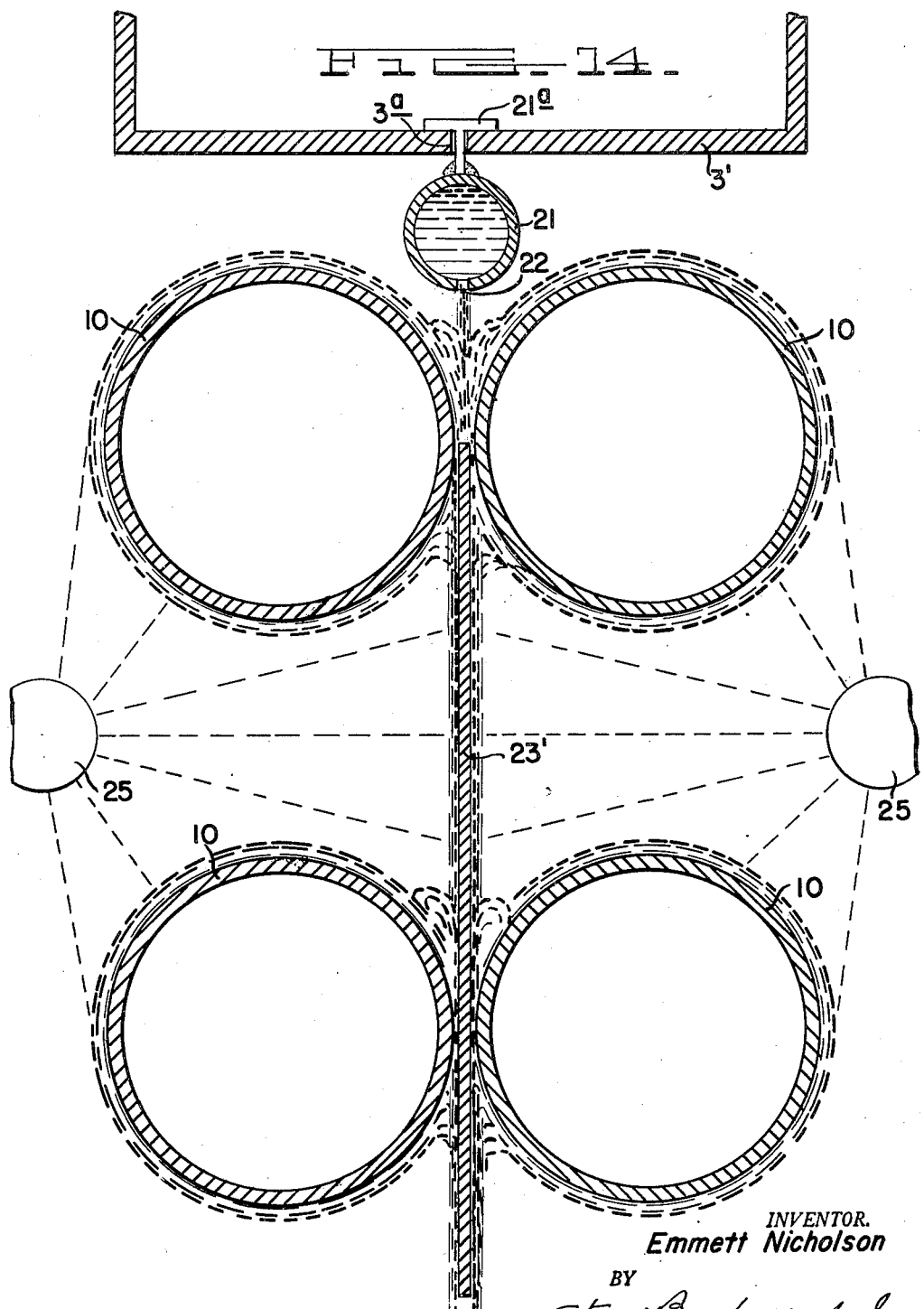

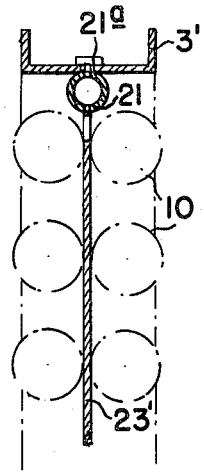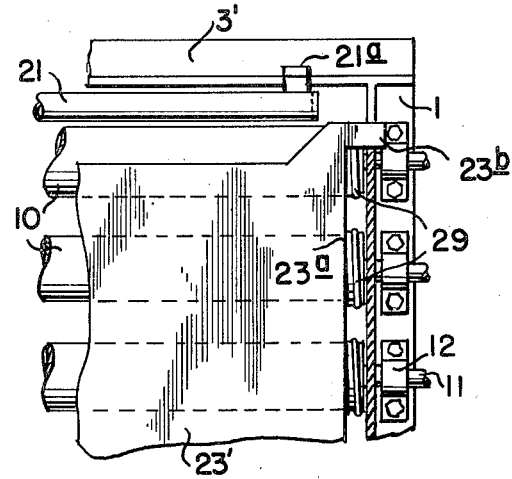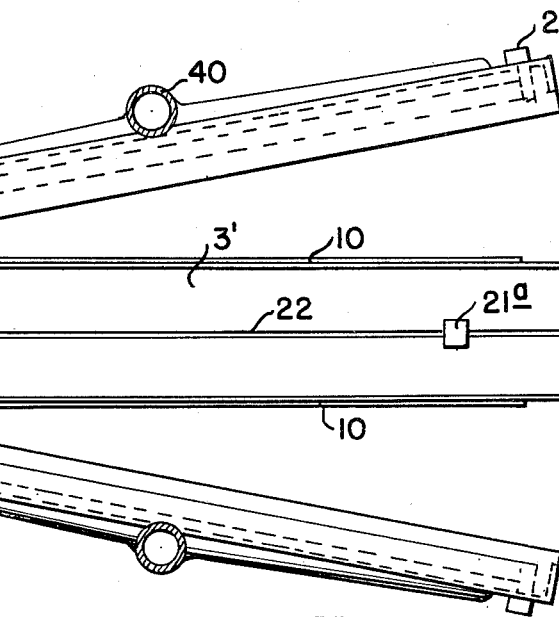

Patented Feb. 28, 1950

2,499,153

UNITED STATES PATENT OFFICE 2,499,153

APPARATUS FOR TREATING LIQUIDS WITH LIGHT RAYS

Emmett Nicholson, Dunedin, Fla., assignor of fifteen per cent to J. Hanson Boyden, Washington, D. C.

Application June 13, 1947, Serial No. 754,534

12 Claims. (Cl. 250—49)

This invention relates to aparatus for treating liquids with light rays, particularly for the purpose of sterilizing them and killing the bacteria which they may contain.

While the apparatus is especially intended for use in the sterilization of liquid foods such as milk and raw fruit and vegetable juices, it is also applicable to the treatment of liquids for purposes other than sterilization, such, for example, for the aging of wines and other liquors, bleaching oils and the like, killing the yeast in beer, and promoting chemical reactions in liquids.

The action of certain light rays, such as ultraviolet rays, in sterilizing liquids has long been known, and various attempts have heretofore been made to utilize this method of sterilization in a practical and commercial way, especially for the treatment of milk, as a substitute for the usual pasteurization. It appears to have been thought necessary, however, to spread the liquid into an exceedingly thin film, when subjecting it to the action of the light rays, and this has rendered the method impracticable because of the prohibitive cost of the relatively large apparatus required to produce a relatively small output.

The general object of the present invention is to devise improved apparatus of simple construction, arranged to operate so efficiently that a compact and relatively low cost unit will be capable of a relatively large output.

To this end, the invention contemplates causing the liquid to be treated to travel over relatively large areas while exposed to the light rays, and to progress in the form of a relatively thick moving film or layer, so produced as to generate turbulence in the liquid constituting the layer, whereby fresh portions of the liquid are continuously brought to the surface of the layer.

A specific object is to provide improved apparatus so constructed that the working parts thereof can be rendered readily accessible for washing and cleaning.

A further specific object is to provide means for carrying off the ozone generated by the ultraviolet lamps so as to prevent contamination of the liquid products thereby.

In order that the invention may be readily understood reference is had to the accompanying drawings forming part of this specification, and in which Fig. 1 is a side elevation of one form of my improved apparatus;

Fig. 2 is a vertical section therethrough substantially on the line 2—2 of Fig. 1 looking in the direction of the arrows;

Fig. 3 is an end elevation, looking in the same direction as Fig. 2;

Fig. 4 is a transverse section substantially on the line 4—4 of Fig. 1, one of the panels being shown in open position;

Fig. 5 is a plan view of the apparatus, both of the panels being shown in open position;

Fig. 6 is a fragmentary transverse section on an enlarged scale illustrating the operation of the invention;

Figs. 7 and 8 are fragmentary transverse sections on a still larger scale illustrating how turbulence is produced in the layer of liquid;

Fig. 9 is a fragmentary side elevation showing portions of two rollers and the plate which cooperates with them, parts being in section;

Fig. 10 is a transverse section through the apparatus shown in Fig. 9;

Fig. 11 is a fragmentary horizontal section through a pair of rollers, showing a modified construction and illustrating how the interior of the rollers may be heated or cooled as desired;

Figs. 12 and 13 are an edge and side view respectively of a modified form of plate which I may employ;

Fig. 14 is a transverse sectional view on an enlarged scale, somewhat similar to Fig. 6, but showing the modified arrangement;

Fig. 15 is a similar view on a smaller scale;

Fig. 16 is a fragmentary side elevation of the apparatus shown in Fig. 15, parts being shown in section and parts omitted;

Fig. 17 is a plan view similar to Fig. 5 but showing a construction modified in accordance with Figs. 15 and 16, and Figs. 18 and 19 are diagrammatic transverse sections similar to Figs. 6 and 14 but showing modified arrangements of rollers.

Referring to the drawings in detail and more particularly first to Figs. 1 to 5 thereof, my improved apparatus is in the form of a rectangular cabinet. This has a main supporting frame which may be of any suitable construction, but which is shown as comprising side members 1 and a top member 3, both being in the form of channels. The cabinet is supported at the bottom by suitable feet 2 secured to the side channels 1.

By reference particularly to Fig. 4, it will be seen that the frame further comprises at each side a pair of angle irons 4, one flange of which overlaps and is secured to the flange of the side channel, and the other flange of which projects laterally beyond such side channel.

A pair of panels, designated in their entirety by numeral 5 constitute the sides of the cabinet, and each of these panels is provided at its side edges with inwardly directed flanges 6 and 7. The flanges 6 are mounted on the angle irons 4 by means of hinges 8, so that the entire panels may swing about these hinges from the closed position shown at the lower side of Fig. 4 to and beyond the open position shown at the upper side of Fig. 4. When closed, the edges of the flanges 7 abut the outturned flanges the angle irons 4 as shown at the right of Fig. 4.

In order to compensate for the laterally projecting flanges of the angle irons 4, the upper flange of the panels 5 is made somewhat wider than the side flanges, as shown at 9 in Fig. 2, and the edges of these flanges 9, when the panels are in closed position, abut against the top channel 3.

Mounted upon the side channels 1 of the frame are a plurality of pairs of horizontally disposed rollers 10, as clearly shown in Figs. 2 and 4. These rollers are carried by shafts 11 journaled in bearings 12 secured to the flanges of the side channels as by bolts 13. To one end of the shafts 11 of each pair of rollers is secured a pair of intermeshing gears 14, and the shaft of one roller of each pair is extended beyond these gears and carries a sprocket wheel 15 (see Fig. 3). A sprocket chain 16 passes down along one side of each of the series of sprockets 15, and up along the other side, thus engaging the sprockets on both sides. This sprocket chain passes around the lowermost sprocket 15 of the series, as shown at the bottom of Fig. 3, and around a driving sprocket 17 mounted on a shaft 18 projecting from a gear box 19 mounted on top of the cabinet and driven by an electric motor 20. Thus as the motor runs, all of the pairs of rollers are driven at the same speed and, by virtue of the intermeshing gears 14 the rollers of each pair turn in opposite directions as shown by the arrows in Fig. 6.

At the top of the cabinet, directly beneath the channel 3 is mounted a transversely extending pipe 21 having in its lower side a slot or slit 22, as best shown in Figs. 6 and 14. This is the feed pipe for the liquid being treated, such liquid escaping from this pipe through the slot 22 in the form of a sheet which falls by gravity down upon the adjacent surfaces of the topmost pair of rollers 10 as shown in Fig. 6.

While the rollers of each pair may or may not come into actual contact, and while either arrangement may be successfully used, with most liquids, I have found that where the rollers are arranged wtih their surfaces in actual contact, and milk is being treated, the action of the rollers tends to produce butter, and this is undesirable. I therefore prefer, especially when treating milk, to space the rollers a short distance apart, such for example as $\frac{1}{16}$ of an inch, so that they do not actually touch. I have discovered that this spacing of the rollers overcomes the above mentioned tendency to form butter. In most of the figures of the drawings therefore I have illustrated the rollers as out of contact with each other, but in Figs. 11 and 18 I have shown them in actual contact. It will be understood that, in general, the spacing of the rollers is governed by the character of the liquid being treated. The heavier the liquid, the greater the space may be. An excessive spacing is indicated by air coming up between the rollers, and this can be prevented by adjusting the rollers slightly closer together. It is undesirable for air to bubble up through the liquid, as this tends to cause foam, which interferes with efficient sterilization.

Immediately beneath the meeting point of the uppermost pair of rollers I mount a vertically disposed plate 23, as shown in Figs. 2 and 6. The upper edge of this plate is disposed adjacent but out of contact with the rollers. As shown in Fig. 2, a similar plate is mounted beneath each pair of rollers throughout the series. These plates may be conveniently supported by means of hooks 24 set into the side members 1 as shown in Figs. 9 and 10.

Mounted upon the inside of each panel 5 is a series of horizontally disposed ultra-violet lamp tubes 25, these being connected to suitable terminals 26 extending through the panel walls and adapted to receive the electrical connections. These lamps are mounted at such vertical positions that they are approximately half way between successive pairs of rollers, as shown in Figs. 2 and 6.

At the bottom of the cabinet is a catch basin or pan 27 in which the liquid collects and from which it is carried away by means of a suitable pipe 28.

It will now be understood that the liquid delivered by the pipe 21 falls down upon the upper pair of rollers 10, which are turning in opposite directions, as shown in Fig. 6. This liquid, if thin, of course, tends to flow downward through the space between the rollers, but the rotation of the rollers tends to prevent this, and if driven at a speed which is suitable for the particular liquid being treated, the liquid, which tends to collect in a pool above the rollers as at $a$ in Fig. 6, is stretched out and carried outwardly and upwardly by the rollers from this pool, and forms itself into a layer or thick film $b$ which adheres to and travels around with the rollers. As this film or layer approaches the bite of the rollers at the lower side thereof, it is more or less squeezed off of the rollers and piles up as indicated at $c$ and is thereupon picked up by the vertical plate 23 and flows downwardly along the sides of this plate as indicated at $d$. This piling and picking up results in a thorough mixing of the liquid. From the lower edge of the plate 23 the liquid falls down onto the adjacent surfaces of the next pair of rollers 10, where the same action takes place. Thus the liquid travels successively over the surfaces of each pair of rollers in the series, from the top to the bottom, and cascades over the surface of the plates 23 from one pair of rollers to the next.

The lamps 25 are so disposed that the rays emanating therefrom impinge upon the surfaces of both the rollers 10 and the plates 23, in such manner that practically the entire surfaces of these rollers and plates receive the rays. Thus the layer or film of liquid traveling down around and over the rollers and plates as described, is continuously subjected to the action of these rays throughout the entire height of the cabinet.

Moreover, from an inspection of Figs. 7 and 8, it will be seen that due to the relative thickness of the layer of thin liquid on the rollers and due to the fluid friction or cohesion between the rollers and the liquid, the portions of the layer next to the rollers tend to be carried along faster than the outer portions thereof which tend to lag, and due to this lag, a very substantial amount of turbulence is created in the liquid in the layer. This turbulence results in the liquid being turned over and over as the rollers revolve, so that fresh portions of the liquid are constantly brought to the outer surface of the layer and subjected to the action of the light rays, as the liquid progresses through the apparatus. Thus, due to this constant changing, all portions of the liquid are thoroughly exposed to the action of the rays, and hence the sterilizing action is exceptionally efficient.

In order to prevent any tendency of very thin liquids to run off the ends of the rollers, means may be provided for forcing the liquid back from the ends. One way of doing this is to provide the end portions of the rollers with helical threads 29 as shown in Figs. 9, 10 and 11, these threads intermeshing. As shown in Fig. 9 it is preferable to notch out the end portions of the plates 23 adjacent these threads as shown at 23a.

Another means for preventing the liquid from tending to run off of the ends of the rollers is to so form the plates 23 that they tend to direct the liquid toward the center of the apparatus. A plate of this kind is illustrated at 36 in Figs. 12 and 13, and is shown as provided with diagonally extending corrugations 37, such corrugations being reversely disposed at opposite sides of the center. It is obvious that these converging corrugations tend to direct the liquid discharged from the plate toward the center of the pair of rollers beneath the same, thus counteracting any tendency of the liquid to escape from the ends of the rollers. Such a plate structure may be used in conjunction with or independently of the threaded portions 29 of the rollers.

Instead of employing a series of separate plates 23 as shown in Figs. 2 and 6, I may employ a single plate 23' as shown in Fig. 14. In this figure this plate is illustrated as extending completely between the rollers of each pair, including the uppermost pair, and the rollers do not contact or scrape the plate but are slightly spaced therefrom. This arrangement serves to transfer the liquid from the rollers to the plate and from one pair of rollers to another, the same as the arrangement shown in Figs. 2 and 6.

Where a single plate of this kind is employed, and referring also to Figures 15 to 17, it is necessary to provide means for the insertion and removal of such a long plate from the machine. To this end I provide the top channel 3' with a central longitudinal slot 3a open at its ends, and provide clips 21a passing through this slot, for supporting the feed pipe 21. When it is desired to insert or remove the plate 23', the feed pipe 21 is first withdrawn to the left as viewed in Fig. 17, and the plate 23' can then readily pass through the slot 22. In this arrangement the plate is preferably supported by means of ears 23b as shown in Fig. 16, engaging in slots at the upper ends of the side members 1. If as indicated in this figure, the end portions of the rollers are threaded as at 29, the side edges 23a of the plate preferably do not overlap the threaded portions.

Referring again to Fig. 11 I have illustrated means by which a cooling or heating fluid may be introduced into the interior of the rollers if desired, to treat certain liquids under definite temperature conditions. In this construction the rollers 10' contain at each end blocks or bushings 31 into which are set hollow shafts 30. The outer ends of these shafts extend through glands or stuffing boxes 32 into stationary pipes or manifolds 33 carrying the heating or cooling fluid.

In this Fig. 11 I have also shown a modified arrangement for driving the rollers. Instead of employing the intermeshing gears 14 shown in Fig. 3, I mount sprocket wheels 34 and 34a in different planes on the shafts of the rollers constituting each pair, and provide a double sprocket chain 35 passing down between and engaging both sets of sprockets. This double sprocket chain is of course driven by a suitable power sprocket (not shown).

In Figs. 18 and 19 I have shown other possible arrangements of rollers which may if desired be employed.

In Fig. 18 I have shown a series of rollers in staggered relation, and so driven that the adjacent surfaces of any two rollers always move in the same direction. The liquid is delivered by a pipe 21 as before, but its distribution upon the uppermost roller is assisted by means of a "doctor" plate 38. In this figure, the rollers are shown as in actual contact, such an arrangement being particularly desirable when treating certain raw fruit juices, in order to crush any particles of pulp which may be present. Owing to the relative direction of rotation of adjacent rollers the film or layer of liquid is readily picked up and transferred from one to the other, so that the liquid passes successively around the rollers and finally is discharged over the plate 39, beneath the lowermost roller.

In Fig. 19 I have shown a vertical series of rollers disposed in a common plane, alternate rollers being driven in opposite directions, so that their surfaces pass each other with a wiping action. This serves to transfer the liquid successively from one roller to the next, as before.

It will thus be seen that the invention is by no means limited to any specific arrangement or grouping of rollers or to any particular relative direction of rotation, but that many various arrangements may be employed, so long as the liquid is transferred to and passes successively around one roller after another while being exposed to the rays.

As is well known, one of the characteristics of an ultra-violet lamp is that it tends to create ozone in the atmosphere surrounding the same. In many cases, as for example in the case of food products, the presence of this ozone in the cabinet is objectionable, and for this reason I have provided means for effectively removing it. Such means, as illustrated in Figs. 1 to 5, consist in the provision of an exhaust manifold comprising a central header 40 and a series of branches 41, associated with each panel 5. As shown, this header and branches are illustrated as cast integral with the panel 5. Each branch 41 is arranged adjacent a lamp and within each branch the wall of the panel is provided with a series of openings 42. Suction being applied, by any suitable means, to the ends of the headers 40, will serve to draw away from the neighborhood of each lamp and remove from the cabinet, any ozone generated by the lamps.

As mentioned in the preamble, I contemplate using my improved apparatus, amongst other things, for killing the yeast in beer, as a substitute for the usual pasteurization. As is well known, this is customary prior to carbonating and bottling, to prevent further fermentation. However, in treating beer and other foaming liquids, it is necessary to subject them to a vacuum to break the foam. This can be done with my improved apparatus by providing suitable gaskets and seals so as to render the cabinet airtight, when closed, and then exhausting the air and other gases and vapors from the interior of the cabinet.

It will be observed that, when it is desired to clean the working parts of the apparatus, all that is necessary is to swing the side panels open on their hinges, and this exposes the rollers and plates so that they may be washed off with a hose. The lamps also are thus made accessible, so that they may be independently and easily cleaned.

What I claim is:

1. Apparatus for treating liquids by means of light rays comprising a closed cabinet having a frame and side walls, a series of horizontal rollers journalled in said frame, one above the other, means for rotating said rollers, means for causing liquid to be treated to travel in the form of a thin film downwardly over each of said rollers in succession, and a series of ultra-violet lamps mounted on the inside of one of the side walls of the cabinet adjacent said series of rollers, said side wall being hinged to said frame at one edge so that it may be swung to open position to afford access to said rollers.

2. Apparatus for treating liquids by means of light rays comprising a plurality of horizontal rollers, disposed one above the other, and means for rotating them at the same speed, means for directing ultra-violet light rays upon the surface of said rollers, means for feeding liquid to be treated on to the uppermost one of said rollers at such a rate as to form thereon a film of liquid, the surfaces of said rollers being in sufficiently close proximity so that liquid is picked up and transferred from one to the other, and means for removing such liquid while still in a fluent state, from the lowermost roller.

3. Apparatus for treating liquids by means of light rays comprising a plurality of horizontal rollers, disposed one above the other, and means for rotating them at substantially the same speed, means for directing ultra-violet light rays upon the surface of said rollers, means for feeding liquid to be treated on to the uppermost one of said rollers at such a rate as to form thereon a layer of liquid, and means by which said liquid is picked up and transferred in the form of a continuous fluent film from said uppermost roller to each of the lower rollers in succession, and is finally removed, while still in the liquid state, from the lowermost roller.

4. Apparatus for treating liquid by means of light rays comprising a pair of rollers mounted with their axes parallel and in substantially the same horizontal plane, and with their surfaces in close proximity but out of contact, means for rotating said rollers, means for feeding a stream of liquid to be treated down from above into the bite between said rollers, at such a rate that a layer of liquid is formed on both rollers, means for directing ultra-violet light rays upon such layer of liquid as the rollers turn, and means out of contact with said rollers for removing the liquid therefrom.

5. Apparatus for treating liquid by means of light rays comprising a pair of rollers mounted with their axes parallel and in substantially the same horizontal plane, and with their surfaces in close proximity, means for rotating said rollers, means for feeding a stream of liquid to be treated down from above into the bite between said rollers, at such a rate that a layer of liquid is formed on both rollers, a vertical plate depending from a point adjacent the bite of said rollers, said plate being in sufficiently close proximity to the surface of both rollers as to pick up and remove liquid therefrom, whereby liquid from said rollers flows down over the surfaces of said plate, and means for directing light rays both upon the layer of liquid carried by said rollers and upon the liquid flowing over the surfaces of said plate.

6. Apparatus for treating liquids by means of light rays comprising a pair of horizontal rollers disposed in close proximity and means for rotating them, means for throwing ultra-violet light rays on the surface of said rollers, means for feeding liquid to be treated from above into the bite between said rollers at such a rate as to form thereon a layer of liquid, and a fixed plate depending from a point adjacent the bite of said rollers; said plate being disposed out of contact with said rollers but in sufficiently close proximity thereto to enable said plate to pick up and remove the liquid from beneath the bite of said rollers where the liquid piles up as the rollers revolve.

7. Apparatus for treating liquid by means of light rays comprising a pair of rollers mounted with their axes parallel and in substantially the same horizontal plane, and with their surfaces in close proximity, means for feeding a stream of liquid to be treated down from above into the bite between said rollers, means for rotating said rollers in opposite directions whereby their adjacent surfaces move upwardly and outwardly from said bite, so that a film of liquid is formed on both rollers, a vertical plate depending from a point adjacent and below the bite of said rollers, the upper edge of said plate being out of contact with said rollers but in sufficiently close proximity to the lower surfaces of both of them as to pick up and remove liquid therefrom in such manner that the liquid so picked up flows down over the surfaces of said plate, and means for directing light rays both upon the film of liquid carried by said rollers and upon the liquid flowing over the surfaces of said plate.

8. Apparatus for treating liquid by means of light rays comprising a pair of rollers mounted with their axes parallel and in substantially the same horizontal plane, and with their surfaces in close proximity, means for feeding a stream of liquid to be treated down from above into the bite between said rollers, means for rotating said rollers in opposite directions so that a film of liquid is formed on both rollers, the speed of rotation being such that the liquid in said film is caused to turn over and over as the rollers rotate, and tends to collect at the lower side of the bite, a vertical plate depending from the point at which the liquid tends to collect and serving to pick up and remove the liquid therefrom, whereby the liquid so picked up flows down over the surfaces of said plate, and means for directing light rays both upon the film of liquid carried by said rollers and upon the liquid flowing over the surfaces of said plate.

9. Apparatus for treating liquid by means of light rays comprising a pair of rollers mounted with their axes parallel and in substantially the same horizontal plane, and with their surfaces in close proximity, means for rotating said rollers, means for feeding a stream of liquid to be treated down from above into the bite between said rollers, at such a rate that a layer of liquid is formed on both rollers, a vertical plate depending from a point adjacent the bite of said rollers, the upper edge of said plate being in sufficiently close proximity to the lower surface of both rollers as to pick up and remove liquid therefrom, whereby liquid from said rollers flows down over the surfaces of said plate, a second similar pair of rollers below said plate and so disposed that liquid flowing from the lower edge of said plate is delivered into the bite of said second pair of rollers, and forms a layer upon said second rollers, and means for directing light rays upon the layers of liquid on both pairs of rollers and on the liquid flowing over the surfaces of said plate.

10. Apparatus for treating liquid by means of light rays comprising a plurality of pairs of parallel rollers, the axes of the rollers of each pair lying in a common plane, and the pairs of rollers being disposed one above the other in a vertical series, the surfaces of the rollers of each pair being out of contact, means for rotating all of said rollers, and a vertical plate extending between the rollers of all of the pairs, the surfaces of said plate being in close proximity to the surfaces of all of said rollers, whereby liquid may freely pass between said plate and rollers and be transferred from one to the other, means for feeding liquid to be treated onto the uppermost pair of rollers, and means for directing light rays upon the liquid flowing over said plate and all of said rollers.

11. Apparatus for treating liquid by means of light rays comprising a pair of rollers mounted with their axes parallel and in the same horizontal plane, and with their surfaces in close proximity, means for rotating said rollers, means for feeding a stream of liquid to be treated down from above into the bite between said rollers, at such a rate that a layer of liquid is formed on both rollers, said rollers having at their end portions intermeshing screw threads so disposed as to tend to force said layers away from said end portions, and means for directing light rays upon said layers of liquid as the rollers turn.

12. Apparatus for treating liquid by means of light rays comprising a pair of rollers mounted with their axes parallel and in the same horizontal plane, and with their surfaces in close proximity, means for rotating said rollers, means for feeding a stream of liquid to be treated down from above into the bite between said rollers, at such a rate that a layer of liquid is formed on both rollers, a vertical plate depending from a point adjacent the bite of said rollers, the upper edge of said plate being in sufficiently close proximity to the lower surface of both rollers as to pick up and remove liquid therefrom, whereby liquid from said rollers flows down over the surfaces of said plate, a second similar pair of rollers below said plate and so disposed that liquid flowing from the lower edge of said plate is delivered into the bite of said second pair of rollers, and forms a layer upon said second rollers, and means for directing light rays upon the layers of liquid on both pairs of rollers and on the liquid flowing over the surfaces of said plate, said plate being formed with diagonally extending liquid guiding elements directed from the upper edge inwardly, toward the lower edge, whereby liquid flowing down over said plate is directed away from the ends toward the center thereof, and is delivered mainly into the middle portion of the bite of said second pair of rollers.

EMMETT NICHOLSON.

REFERENCES CITED

The following references are of record in the file of this patent:

UNITED STATES PATENTS

| Number | Name | Date |
| --- | --- | --- |
| 316,145 | Hencke | Apr. 21, 1885 |
| 1,068,898 | Henri et al. | July 29, 1913 |
| 1,633,689 | Thal | June 28, 1927 |
| 1,817,936 | Supplee | Aug. 11, 1931 |
| 2,072,418 | Berndt et al. | Mar. 2, 1937 |
| 2,143,019 | Lavett | Jan. 10, 1939 |
| 2,150,263 | Chesney | Mar. 14, 1939 |
| 2,291,574 | Gleason et al. | July 28, 1942 |
| 2,458,019 | Niles | Jan. 4, 1949 |